May 29, 1923.
J. F. O'CONNOR
1,456,995
FRICTION SHOCK ABSORBING MECHANISM
Filed Oct. 4, 1920
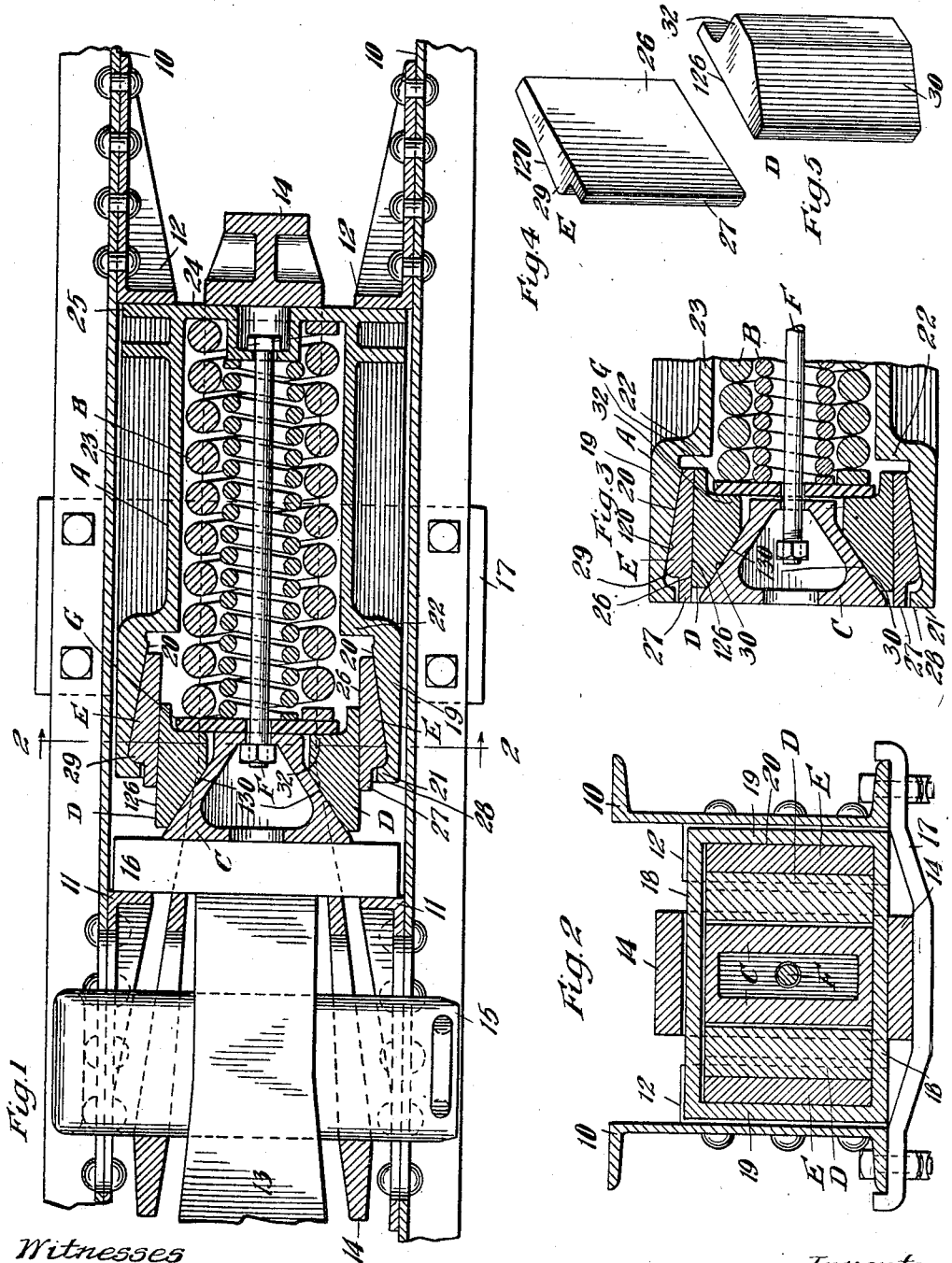
Witnesses
Wm. Geiger
Inventor
John F. O'Connor
By Geo. I. Haight
His Atty.

Patented May 29, 1923.

1,456,995

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed October 4, 1920. Serial No. 414,665.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawing, forming a part of this specification.

This invention relates to improvements in friction shock absorbing mechanisms.

One object of the invention is to provide a friction shock absorbing mechanism, especially adapted for railway draft riggings, wherein is obtained high capacity and certain release.

Another object of the invention is to provide a friction shock absorbing mechanism of the character indicated wherein the frictional resistance is progressively increased during the compression stroke until, at the end of the permissible movement, the frictional resistance is exceedingly great but without militating against the easy and certain release of the friction elements.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. Figure 3 is a horizontal sectional view, parts being broken away, corresponding to Figure 1, showing the position of the parts at the end of the compression stroke. And Figures 4 and 5 are detail perspectives of a shell friction element and a friction shoe, respectively.

In said drawing, 10—10 denote channel center or draft sills of a railway car to the inner faces of which are secured front stop lugs 11—11 and rear stop lugs 12—12. The rear portion of a drawbar is indicated at 13, the same being operatively connected to a hooded cast yoke 14 by a coupler key 15. The shock absorbing mechanism proper, hereinafter described, is mounted within the yoke 14 as is also a front follower 16. The yoke and associated movable parts are supported in operative position by a detachable saddle plate 17.

The improved shock absorbing mechanism, as shown, comprises, broadly, a combined friction shell and spring cage casting A; a spring resistance B; a wedge or spreader C; a pair of friction shoes D—D; a pair of friction shell elements E—E; a retainer bolt F; and a spring follower G.

In the particular embodiment of the invention shown, the friction shell is formed at the outer end of the casting A and is of generally rectangular formation having upper and lower walls 18—18 and side walls 19—19. The side walls 19—19 are provided on their inner sides with inwardly converging surfaces 20—20 extending at a relatively keen or acute angle with respect to the axis of the mechanism. Limiting shoulders 21—21 are formed at the outer ends of said surfaces 20 and other shoulders 22—22 are formed at the inner ends thereof. The spring cage portion proper 23 of the casting A is of generally cylindrical form to act as a centering means for the coil spring B. At its rear end, the casting A is formed with an integral wall 24 and laterally extended reinforcing flanges 25—25 to adapt the rear end of the casting A to act as the rear follower of the draft gear.

The two friction shell elements E are of like form and each is of relatively keen angled cross section when the section is taken in a plane perpendicular to the surfaces 20 of the friction shell. Each of said members E is formed on its outer side with a surface 120 conforming to the corresponding engaging surface 20 of the shell and on its inner side, each member E is formed with another flat friction surface 26. The members E are provided with outwardly extended flanges 27—27 which normally extend a short distance, approximately three-eighths of an inch in actual practice, beyond the outer end 28 of the friction shell. In actual practice, the friction surfaces 26 will extend at a very keen angle with respect to the axis of the shell so as to produce, in effect, a very slightly tapered friction shell effect. As will be clear from an inspection of Figure 1, the elements E have shoulders 29 cooperable with the shell shoulders 21 to limit the outward movements of the members E.

The friction shoes D are of like construction and each is formed on its outer side with a longitudinally extending flat friction surface 126 adapted to cooperate with the corresponding friction surfaces 26. On its inner side each shoe D is formed with a wedge face 30 extending at a comparatively blunt angle with respect to the axis of the shell.

The wedge or spreader C is preferably in the form of a cored casting and has two wedge faces 130—130 corresponding to and co-operable with the wedge faces 30—30 of the shoes. At its inner end, the wedge C normally bears against the spring follower G which engages with the outer end of the spring B. Said follower G is adapted to co-operate with opposed shoulders 32—32 on the shoes D to insure the outward movement of the shoes D during release.

The operation is as follows, assuming an inward or buffing movement of the drawbar. As the drawbar 13 and follower 16 are moved inwardly under a buffing stress, the wedge C forces the shoes D in the same direction. Initially there will be an almost infinitesimal period of inertia in the shoes D which will cause the wedge C to advance longitudinally a minute amount with respect to the shoes. Thereafter the wedge C, shoes D and follower G will travel substantially as a unit, except for a slight differential movement between said wedge and shoes, as hereinafter described, the initial inward movement of the wedge C, and the movement of the shoes D, when advanced sufficiently by the differential movement of the wedge and shoes, being directly resisted by the spring B. Due to the slight convergence of the friction surfaces 26—26, the resistance to the movements of the shoes D will gradually increase and the outward radial pressure exerted by the shoes on the elements E will correspondingly increase. As the outward radial pressure is increased, in the manner just described, the elements E will be gradually picked up and advanced inwardly of the shell with an ever-increasing resistance thereto until the end of the compression stroke when the parts assume the condition illustrated in Figure 3. The extended flanges 27 of the elements E are left so as to insure the complete inward or longitudinal movement of the elements E under heavy blows in case the elements E are not frictionally fully advanced by the shoes D. This result is of course accomplished by the follower 16 engaging the extended flanges 27 during the last part of the compression stroke in the event any portion of said flanges 27 remains outside of the shell. Due to the tapering or converging surfaces 26 and 20, there will naturally occur some expansion in the friction shell itself and in addition a slight differential action will occur between the wedge and shoes. Upon removal of the actuating pressure, it will be noted that the spring acts in a direct manner upon the shoes D, thru the follower G and because of the relatively blunt angled engagement between said wedge and the shoes D, release is easily effected. Furthermore, the inclined or converging surfaces 20 of the shell facilitate the release or outward movement of the elements E. From the preceding description, it will be observed that, after the initial action of the relatively blunt wedge with respect to the shoes D, the wedge and shoes D travel substantially as a unit and an extremely keen angled wedging effect is thereafter obtained between the shoes D and the shell elements E and the latter ultimately function as friction shoes with a restricted travel on the friction shell proper.

I have herein shown and described what I now consider the preferred manner of carrying out the invention, but all changes and modifications that come within the scope of the claims appended hereto, are contemplated.

I claim:

1. In a friction shock absorbing mechanism, the combination with a shell having inwardly converging interior surfaces; of separate auxiliary friction shell elements mounted on said surfaces and adapted for limited movement with respect thereto, said elements providing main shell friction surfaces; friction shoes slidable on said main shell friction surfaces; for an amount substantially more than half of the total travel of the mechanism; spreading means cooperable with said shoes; a spring resistance; and means for positively insuring movement of said shell elements inwardly of the shell during the last portion only of the compression stroke.

2. In a friction shock absorbing mechanism, the combination with a shell having inwardly converging interior surfaces; of separate auxiliary friction shell elements mounted on said surfaces and adapted for limited movement with respect thereto, said elements providing main shell friction surfaces; friction shoes slidable on said main shell friction surfaces for an amount substantially more than half of the total travel of the mechanism; spreading means cooperable with said shoes; and a spring resistance.

3. In a friction shock absorbing mechanism, the combination with a shell having converging interior surfaces; of separate auxiliary friction shell elements mounted on said surfaces and adapted for limited movement with respect thereto, said elements being provided on their inner sides with friction surfaces; friction shoes cooperable with said elements and slidable on said friction surfaces; a wedge cooperable with said shoes, the angle of the wedge faces on the wedge and shoes extending at a blunter angle with respect to the axis of the shell than the angle of said converging surfaces of the shell; and a spring resistance.

4. In a friction shock absorbing mechanism, the combination with a shell having converging interior surfaces; of separate auxiliary friction shell elements mounted on said surfaces and adapted for limited movement with respect thereto, said elements being provided on their inner sides with friction surfaces; friction shoes cooperable with said elements and slidable on said friction surfaces; a wedge cooperable with said shoes, the angle of the wedge faces on the wedge and shoes extending at a blunter angle with respect to the axis of the shell than the angle of said converging surfaces of the shell; and a spring resistance, one end of said spring resistance directly engaging said wedge.

5. In a friction shock absorbing mechanism, the combination with a shell having converging interior surfaces; of separate auxiliary friction shell elements mounted on said surfaces and adapted for limited movement with respect thereto, said elements being provided on their inner sides with friction surfaces converging inwardly of the shell at an acuter angle than that of said interior surfaces of the shell; friction shoes cooperable with the friction surfaces of said elements; a wedge cooperable with said shoes, said wedge and shoes having cooperating wedge faces extending at a relatively blunt angle with respect to the axis; and a spring resistance.

6. In a friction shock absorbing mechanism, the combination with a shell having converging interior surfaces; of separate auxiliary friction shell elements mounted on said surfaces and adapted for limited movement with respect thereto, each of said elements having an inner friction surface and a flange at its outer end extended normally a short distant beyond the outer end of the shell; friction shoes cooperable with the friction surfaces of said elements, the outer ends of said shoes being normally extended outwardly an appreciable distance beyond the outer ends of said elements; a wedge cooperable with said shoes; a spring resistance; and means, movable in unison with the wedge, adapted to engage said extended ends of said elements during the final portion only of the compression stroke.

7. In a friction shock absorbing mechanism, the combination with a shell having inwardly converging interior surfaces; of separate auxiliary friction shell elements mounted on said surfaces and adapted for limited movement with respect thereto, said elements, on their inner sides, providing main friction shell surfaces; cooperating shoulders on the shell and said elements limiting the outward movement of said elements with respect to the shell; friction shoes slidable on said main shell friction surfaces for an amount equal to a major portion of the full travel of the mechanism; spreading means cooperable with said shoes; and a spring resistance.

In witness that I claim the foregoing 1 have hereunto subscribed my name this 24th day of Sept. 1920.

JOHN F. O'CONNOR.

Witness:
CARRIE GAILING.